United States Patent
Du et al.

(10) Patent No.: US 11,907,844 B2
(45) Date of Patent: Feb. 20, 2024

(54) PROCESSING METHOD AND ACCELERATING DEVICE

(71) Applicant: Shanghai Cambricon Information Technology Co., Ltd., Pudong New Area (CN)

(72) Inventors: Zidong Du, Pudong New Area (CN); Xuda Zhou, Pudong New Area (CN); Shaoli Liu, Pudong New Area (CN); Tianshi Chen, Pudong New Area (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 806 days.

(21) Appl. No.: 16/699,032

(22) Filed: Nov. 28, 2019

(65) Prior Publication Data
US 2020/0104693 A1 Apr. 2, 2020

Related U.S. Application Data

(63) Continuation of application No. 16/699,027, filed on Nov. 28, 2019, which is a continuation-in-part of (Continued)

(51) Int. Cl.
*G06N 3/082* (2023.01)
*G06F 1/3296* (2019.01)
(Continued)

(52) U.S. Cl.
CPC ........... *G06N 3/082* (2013.01); *G06F 1/3296* (2013.01); *G06F 9/3877* (2013.01);
(Continued)

(58) Field of Classification Search
CPC ........ G06N 3/082; G06N 3/04; G06N 3/0445; G06N 3/0454; G06N 3/0481; G06N 3/063;
(Continued)

(56) References Cited

U.S. PATENT DOCUMENTS

| 11,315,018 B2 * | 4/2022 | Molchanov ............ G06N 3/082 |
| 2003/0204311 A1 * | 10/2003 | Bush ........................ G01V 1/30 |
| | | 702/13 |

(Continued)

FOREIGN PATENT DOCUMENTS

| CN | 105512723 A | 4/2016 |
| CN | 106485316 A | 3/2017 |

(Continued)

OTHER PUBLICATIONS

Zhou et al.; "Cambricon-S: Addressing Irregularity in Sparse Neural Networks through A Cooperative Software/Hardware Approach"; 51st Annual IEEE/ACM International Symposium on Microarchitecture (Year: 2018).*

(Continued)

*Primary Examiner* — Nha T Nguyen
(74) *Attorney, Agent, or Firm* — Getech Law LLC; Jun Ye

(57) ABSTRACT

The present disclosure provides a processing device including: a coarse-grained pruning unit configured to perform coarse-grained pruning on a weight of a neural network to obtain a pruned weight, an operation unit configured to train the neural network according to the pruned weight. The coarse-grained pruning unit is specifically configured to select M weights from the weights of the neural network through a sliding window, and when the M weights meet a preset condition, all or part of the M weights may be set to 0. The processing device can reduce the memory access while reducing the amount of computation, thereby obtaining an acceleration ratio and reducing energy consumption.

20 Claims, 7 Drawing Sheets

Related U.S. Application Data application No. PCT/CN2018/088033, filed on May 23, 2018.

(51) Int. Cl.

| | |
|---|---|
| G06F 9/38 | (2018.01) |
| G06F 13/16 | (2006.01) |
| G06N 3/04 | (2023.01) |
| G06N 3/084 | (2023.01) |
| G06F 16/28 | (2019.01) |
| G06N 3/063 | (2023.01) |
| G06F 12/0875 | (2016.01) |
| G06N 3/044 | (2023.01) |
| G06N 3/048 | (2023.01) |

(52) U.S. Cl.
CPC .......... *G06F 12/0875* (2013.01); *G06F 13/16* (2013.01); *G06F 16/285* (2019.01); *G06N 3/04* (2013.01); *G06N 3/044* (2023.01); *G06N 3/048* (2023.01); *G06N 3/063* (2013.01); *G06N 3/084* (2013.01); *G06F 2212/452* (2013.01); *G06F 2213/0026* (2013.01)

(58) Field of Classification Search
CPC .......... G06N 20/00; G06N 3/02; G06N 3/084; G06N 3/08; G06N 3/044; G06N 3/048; G06N 3/045; G06F 1/3296; G06F 12/0848; G06F 12/0875; G06F 9/3877; G06F 13/16; G06F 16/285; G06F 2212/452; G06F 2212/454; G06F 2213/0026; G06F 2212/1008; G06F 2212/1032; G06F 2212/1041; G06F 18/23213; G06K 9/6223; Y02D 10/00

See application file for complete search history.

(56) References Cited

U.S. PATENT DOCUMENTS

| | | | | |
|---|---|---|---|---|
| 2004/0180690 | A1* | 9/2004 | Song | H04M 1/72469 |
| | | | | 455/556.1 |
| 2016/0358069 | A1 | 12/2016 | Brothers | |
| 2018/0046900 | A1* | 2/2018 | Dally | G06F 9/30018 |
| 2019/0362235 | A1* | 11/2019 | Xu | G06N 3/084 |
| 2020/0097806 | A1* | 3/2020 | Chen | G06N 3/082 |
| 2020/0097826 | A1* | 3/2020 | Du | G06N 3/0445 |
| 2020/0097827 | A1* | 3/2020 | Wang | G06F 12/0875 |
| 2020/0097828 | A1* | 3/2020 | Du | G06F 9/3877 |
| 2020/0097831 | A1* | 3/2020 | Wang | G06F 16/285 |
| 2021/0182077 | A1* | 6/2021 | Chen | G06V 10/82 |
| 2021/0224069 | A1* | 7/2021 | Chen | G06F 9/30032 |

FOREIGN PATENT DOCUMENTS

| | | | | |
|---|---|---|---|---|
| CN | 106548234 | A | * 3/2017 | ............ G06F 17/16 |
| CN | 106548234 | A | 3/2017 | |
| CN | 106919942 | A | 7/2017 | |
| CN | 106991477 | A | 7/2017 | |

OTHER PUBLICATIONS

Yu et al.; "Scalpel: Customizing DNN Pruning to the Underlying Hardware Parallelism"; 2017 ACM/IEEE 44th Annual International Symposium on Computer Architecture (ISCA); Conference Paper | Publisher: IEEE Cited by: Papers (38) | Patents (1) (Year: 2017).*

Yang et al.; "Designing Energy-Efficient Convolutional Neural Networks using Energy-Aware Pruning"; 2017 IEEE Conference on Computer Vision and Pattern Recognition (CVPR); Conference Paper | Publisher: IEEE Cited by: Papers (230) | Patents (29) (Year: 2017).*

Mao et al.; 2017 IEEE Conference on Computer Vision and Pattern Recognition (CVPR); Conference Paper | Publisher: IEEE Cited by: Papers (230) | Patents (29) (Year: 2017).*

Parashar et al.; "SCNN: An Accelerator for Compressed-sparse Convolutional Neural Networks"; 2017 ACM/IEEE 44th Annual International Symposium on Computer Architecture (ISCA); Conference Paper | Publisher: IEEE Cited by: Papers (34) | Patents (5) (Year: 2017).*

Anwar et al.; "Compact Deep Convolutional Neural Networks With Coarse Pruning"; Under review as a conference paper at ICLR 2017; Department of Electrical Engineering and Computer Science Seoul National University; Gwanak-Gu, 08826, Republic of Korea (Year: 2017).*

Mao et al.; "Exploring the Regularity of Sparse Structure in Convolutional Neural Networks"; Stanford University; 2NVIDIA; 3Tsinghua University (Year: 2017).*

Moons, Bert, et. al. "Energy-Efficient ConvNets Through Approximate Computing", arXiv:1603.06777v1, Mar. 22, 2016, 8 pages.

EP 19 214 010.1, Communication pursuant to Article 94(3), dated Jan. 3, 2022, 11 pages.

Huang, Hongmei, et al., "Fault Prediction Method Based on RBF Network On-Line Learning", Journal of Nanjing University of Aeronautics & Astronautics, vol. 39 No. 2, Apr. 2007, 4 pages.

CN 201710370905.1—Second Office Action, dated Mar. 18, 2021, 11 pages. (with English translation).

CN 201710583336.9—First Office Action, dated Apr. 23, 2020, 15 pages. (with English translation).

CN 201710677987.4—Third Office Action, dated Mar. 30, 2021, 16 pages. (with English translation).

CN 201710678038.8—First Office Action, dated Oct. 10, 2020, 12 pages. (with English translation).

CN 201710689666.6—First Office Action, dated Jun. 23, 2020, 19 pages. (with English translation).

CN 201710689666.6—Second Office Action, dated Feb. 3, 2021, 18 pages. (with English translation).

CN 201710689595 X—First Office Action, dated Sep. 27, 2020, 21 pages. (with English translation).

Liu, Shaoli, et al., "Cambricon: An Instruction Set Architecture for Neural Networks", ACM/IEEE, 2016, 13 pages.

CN 201710689595.X—Second Office Action, dated Jun. 6, 2021, 17 pages. (with English translation).

EP 18 806 558.5, Communication pursuant to Article 94(3), dated Dec. 9, 2021, 11 pages.

EP 19 214 007.7, Communication pursuant to Article 94(3), dated Dec. 8, 2021, 10 pages.

EP 19 214 015.0, Communication pursuant to Article 94(3), dated Jan. 3, 2022, 12 pages.

PCT/CN2018/088033—Search Report, dated Aug. 21, 2018, 19 pages. (with English translation).

Zeng Dan et al.: "Compressing Deep Neural Network for Facial Landmarks Detection", International Conference on Financial Cryptography and Data Security, Nov. 13, 2016, 11 Pages.

Song Han et al; "Deep Compression: Compressing Deep Neural Networks with Pruning, Trained Quantization and Huffman D2 Coding", Internet: URL:https://arxiv.org/pdf/1510.00149v5.pdf; Feb. 15, 2016; 14 pages.

Fujii Tomoya et al; "An FPGA Realization of a Deep Convolutional Neural Network Using a Threshold Neuron Pruning", International Conference on Financial Cryptography and Data Security; Mar. 31, 2017; 13 pages.

Sun Fangxuan et al.; "Intra-layer nonuniform quantization of convolutional neural network" 2016 8th International Conference on Wireless Communications & Signal Processing (WCSP), IEEE, Oct. 13, 2016, 5 pages.

Song Han et al.: "ESE: Efficient Speech Recognition Engine with Sparse LSTM on FPGA", Proceedings of The 2017 ACM/SIGDA International Symposium on Field-Programmable Gate Arrays; Feb. 17, 2017; 10 pages.

Sajid Anwar et al; "Structured Pruning of Deep Convolutional Neural Networks", ACM Journal on Emerging Technologies in Computing Systems; Feb. 9, 2017, 18 pages.

(56) References Cited

OTHER PUBLICATIONS

Yunchao Gong et al.; "Compressing Deep Convolutional Networks using Vector Quantization", Internet: URL:https://arxiv.org/pdf/1412.6115.pdf ; Dec. 18, 2014, 10 pages.
Kadetotad Deepak et al.; "Efficient memory compression in deep neural networks using coarse-grain sparsification for speech applications", 2016 IEEE/ACM International Conference on Computer-Aided Design, Nov. 7, 2016, 8 pages.
Song Han et al.; "Leraning both weights and connections for efficient neural networks" Published as a conference paper at NIPS 2015; Internet URL: https://arxiv.org/abs/1506.02626; Oct. 30, 2015; 9 pages.
EP 18806558.5, European Search Report dated Apr. 24, 2020, 13 pages.
EP 19214007.7, European Search Report dated Apr. 15, 2020, 12 pages.
EP 19214010.1, European Search Report dated Apr. 21, 2020, 12 pages.
EP 19214015.0, European Search Report dated Apr. 21, 2020, 14 pages.

\* cited by examiner

PROCESSING METHOD AND ACCELERATING DEVICE

TECHNICAL FIELD

The disclosure relates to the field of computer, particularly to the field of artificial intelligence.

BACKGROUND

Neural networks have been successfully applied. However, as neural networks that are deeper and larger in scale have been designed, more weights would be introduced, and therefore super large-scale weight may become a huge challenge to neural network disclosure. On the one hand, large-scale weight data imposes a higher requirement on storage capacity, and a large amount of storage operation will cost high memory access energy consumption. On the other hand, a large number of weights also impose a higher requirement on operation units, thus the computing time and energy consumption increase accordingly. Therefore, it has become an urgent problem to reduce the weights of neural networks on the premise of reducing the computation precision so that the data storage and computational amount could also be reduced.

Most of the current work mainly adopts low-rank matrix decomposition, hash techniques, or the like, however, weights and the amount of computation that may be reduced by using those methods are limited, and the precision of the neural network may also be reduced. Therefore, a more effective method is needed to reduce the weights of neural networks and the amount of computation.

SUMMARY

Technical Problems to be Solved

The disclosure is intended to provide a processing device to solve at least one of the above-described technical problems.

Technical Solutions

The present disclosure provides a processing device including a storage unit, a coarse-grained pruning unit, a coarse-grained selection unit, and an operation unit.

A storage unit may be configured to store an input neuron, an output neuron, a weight, and an instruction of a neural network.

A coarse-grained pruning unit may be configured to perform coarse-grained pruning on the weight of the neural network to obtain a pruned weight and store the pruned weight and the position information of a target weight into the storage unit; in which the absolute value of the target weight is greater than a second given threshold. The coarse-grained pruning unit may be specifically configured to: select M weights from the weights of neural network through a sliding window, where the M is an integer greater than 1; and when the M weights meet a preset condition, all or part of the M weights may be set to 0.

The operation unit may be configured to perform training according to the pruned weight, and the weight that has been set to 0 in the training process remains 0.

The coarse-grained selection unit may be configured to receive an input neuron and the position information of the target weight and select an input neuron corresponding to the target weight according to the position information of the target weight.

The operation unit may be further configured to perform neural network operation according to an input target weight and an input neuron corresponding to the target weight to get an output neuron, and to transmit the output neuron to the storage unit as the input neuron of a next layer.

Furthermore, the preset condition may include: the information quantity of the M weights is less than a first given threshold.

Furthermore, the information quantity of the M weights is an arithmetic mean of the absolute value of the M weights, a geometric mean of the absolute value of the M weights or a maximum value of the M weights; the first given threshold is a first threshold, a second threshold or a third threshold; and the information quantity of the M weights being less than the first given threshold may include:

the arithmetic mean of the absolute value of the M weights being less than the first threshold, or the geometric mean of the absolute value of the M weights being less than the second threshold, or the maximum value of the M weights being less than the third threshold.

Furthermore, the coarse-grained pruning unit and the operation unit may configure to:

repeat performing coarse-grained pruning on the weights of neural network and training the neural network according to the pruned weight until no weight meets the preset condition without losing a preset precision.

Furthermore, the neural network may include a fully connected layer, a convolutional layer and/or a LSTM layer. The weight of the fully connected layer is a two-dimensional matrix (Nin, Nout), where Nin represents the count of input neurons and Nout represents the count of output neurons, and the fully connected layer has Nin*Nout weights; the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the weight of LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer. The coarse-grained pruning unit is specifically configured to:

perform coarse-grained pruning on the weight of the fully connected layer, where the sliding window is a two-dimensional sliding window with the size of Bin*Bout, Bin is a positive integer greater than 0 and less than or equal to Nin, and Bout is a positive integer greater than 0 and less than or equal to Nout;

make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;

select M weights from the Nin*Nout weights through the sliding window, and when the M weights meet the preset condition, all or part of the M weights may be set to 0, where M=Bin*Bout;

perform coarse-grained pruning on the weights of the convolutional layer, the sliding window is a four-dimensional sliding window with the size of $Bfin*Bfout*Bx*By$, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By;

select M weights from the $Nfin*Nfout*Kx*Ky$ weights through the sliding window, and when the M weights meet the preset condition, all or part of the M weights may be set to 0, where $M=Bfin*Bfout*Bx*By$;

perform coarse-grained pruning on the weights of the LSTM layer, the size of the sliding window is $Bin\_i*Bout\_i$, where Bin_i is a positive integer greater than 0 and less than or equal to Nin_i, and Bout_i is a positive integer greater than 0 and less than or equal to Nout_i;

make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights meet the preset condition, all or part of the M weights may be set to 0, where $M=Bin\_i*Bout\_i$.

Furthermore, the processing device may also include an instruction control unit configured to receive the instruction and generate a control instruction to control the operation unit after decoding.

Furthermore, the storage unit may be configured to store the target weight and the data of the target weight position.

Furthermore, the processing device may also include a pre-processing unit configured to preprocess an input neuron and a weight, and input the preprocessed data to the storage unit.

Furthermore, the pre-processing may include data segmentation, Gaussian filter, binarization, regularization and/or normalization processing.

Furthermore, the processing device may also include an instruction caching unit configured to cache the instruction.

Furthermore, the processing device may also include a target weight caching unit configured to cache data of the target weight.

Furthermore, the processing device may also include a target weight position caching unit configured to cache the position information of the target weight.

Furthermore, the processing device may also include an input neuron caching unit configured to cache an input neuron.

Furthermore, the processing device may also include an output neuron caching unit configured to cache an output neuron.

Furthermore, the instruction caching unit, the target weight caching unit, the target weight position caching unit, the input neuron cache or the output neuron cache is an on-chip caching unit.

Furthermore, the target weight position caching unit may be configured to cache the position information of the target weight, and map each connection weight in the input data to the corresponding input neuron.

Furthermore, the processing device may also include a DMA unit configured to read and write data or instruction between the storage unit and the instruction caching unit, the target weight caching unit, the target weight position caching unit, the input neuron caching unit, or the output neuron caching unit.

Furthermore, the operation unit may include at least one of the following:
a multiplier configured to multiply first input data and second input data to obtain a product;
one or more adders configured to add third input data step by step;
an activation function unit configured to get the output data by performing action function on fifth data, where the activation function may include sigmoid, tanh, relu or softmax.

Furthermore, the operation unit may include a plurality of adders, and the plurality of adders compose an adder tree configured to add third input data step by step.

Furthermore, the operation unit may also include a pooling unit configured to perform a pooling operation on input data to obtain the output data after pooling operation. The pooling operation may include mean pooling, maximum pooling, or median pooling.

Furthermore, the operation unit may also configure to repeat training the pruned neural network until no weight can be set to 0 without losing a preset precision.

Technical Effects

The processing device provided by the disclosure at least have the following advantages.

Compared with the prior arts, the processing method of the present disclosure performs coarse-grained pruning on the weight of the neural network, which can regularize the sparsification of the neural network, facilitate accelerating by using hardware, and reduce the storage space of a target weight position, where the target weight is a weight whose absolute value is greater than or equal to the second given threshold.

The processing device of the present disclosure can realize the processing method of the present disclosure, the coarse-grained pruning unit may be configured to perform coarse-grained pruning on the neural network, and the operation unit may be configured to retrain the pruned neural network.

By setting up the neural network capable of accelerating the processing of coarse-grained pruning, the accelerating device of the present disclosure can fully explore the characteristics of coarse-grained sparse, reduce access and computation, so as to realize acceleration and reduce energy consumption.

The storage unit of the accelerating device of the present disclosure may store the target weight and the position information of the weight, which can reduce the storage overhead and the memory access overhead, and the coarse-grained selection unit can select the neurons that need to participate in the operation according to the target weight position information, which may reduce the amount of computation; by adopting a dedicated SIMD instruction and a customized operation unit for a multi-layer artificial neural network operation aiming at coarse-grained sparsification, the problem that the CPU (Central Processing Unit) and GPU (General Processing Unit) have inadequate operational performance and the front-end decoding overhead is high may be solved, and the support for a multi-layer artificial neural network operation algorithm may be effectively improved; by adopting a dedicated on-chip cache for the multi-layer artificial neural network operation algorithm, the reuse of input neurons and weight data may be fully exploited, which avoids repeatedly reading these data into memory, reduces memory access bandwidth. Therefore, the memory bandwidth may no longer be bottleneck of the performance of multi-layer artificial neural network operations and training algorithms.

DETAILED DESCRIPTION OF THE EMBODIMENTS

In order to make the purpose, technical solutions, and advantages of the disclosure clearer, the disclosure will further be described below in combination with specific embodiments and with reference to the accompanied drawings in detail.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

It should be noted that "first", "second", "third", etc., used in the present disclosure are only used to distinguish different objects, and do not imply that there is any particular sequential relationship between these objects.

It should be noted that the coarse-grained pruning (or coarse-grained sparsification) refers to obtaining at least two data (weight or neuron), and when the at least two data meet a preset condition, all or part of the at least two data may be set to 0.

According to the basic conception of this disclosure, a processing method performing coarse-grained pruning and sparsification on a neural network, a processing device, and an accelerating device are provided to reduce weight storage and computation.

Figure 1:
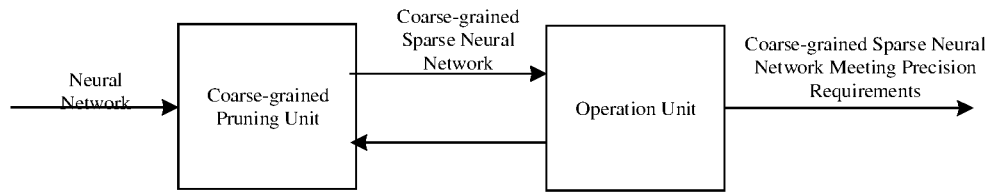
FIG. 1 is a schematic structure diagram of a processing device for performing coarse-grained pruning and sparsification on a neural network according to an embodiment of the disclosure.

FIG. 1 is a schematic structure diagram of a processing device performing coarse-grained pruning and sparsification on a neural network according to an embodiment of the disclosure. As shown in FIG. 1, the processing device may include:

a coarse-grained pruning unit configured to perform coarse-grained pruning on the weight of the neural network to obtain a pruned weight.

The coarse-grained pruning unit is specifically configured to:

select M weights from the weights of the neural network through a sliding window, where M may be an integer greater than 1; and when the M weights meet a preset condition, all or part of the M weights may be set to 0;

where the preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights, or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Furthermore, the neural network may include a fully connected layer, a convolutional layer; and/or a LSTM (long and short term memory) layer. The weight of the fully connected layer is a two-dimensional matrix (Nin, Nout), where Nin represents the count of input neurons and Nout represents the count of output neurons, and the fully connected layer has Nin*Nout weights; the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer. The coarse-grained pruning unit may be specifically configured to:
  perform coarse-grained pruning on the weight of the fully connected layer, where a sliding window is a sliding window with the size of Bin*Bout, Bin is a positive integer greater than 0 and less than or equal to Nin, and Bout is a positive integer greater than 0 and less than or equal to Nout; make the sliding window slide according to a stride Sin in the direction of Bin, or slide Sout stride in the direction of Bout, where Sin is a positive integer greater than 0 and less than or equal to Bin, and Sout is a positive integer greater than 0 and less than or equal to Bout; select M weights from the Nin*Nout weights through the sliding window, and when the M weights meet the preset condition, all or part of the M weights may be set to 0, where M=Bin*Bout, please refer to FIG. 2 for a specific process;
  perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; select M weights from the Nfin*Nfout*Kx*Ky weights through the sliding window, and when the M weights meet the preset condition, all or part of the M weights may be set to 0, where M=Bfin*Bfout*Bx*By; please refer to FIG. 3 for a specific process; and
  perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i; make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; select M weights from the Bin_i*Bout_i weights through the sliding window, and when the M weights meet the preset condition, all or part of the M weights may be set to 0, where M=Bin_i*Bout_i.

Furthermore, the M weights are the weights included in the sliding window during the sliding process. The setting, by the coarse-grained pruning unit, all or part of the M weights to 0 may include:
  the coarse-grained pruning unit setting all the weights (i.e., M weights) in the sliding window to 0; or setting the weight on the diagonal in the sliding window to 0; or setting a part of the middle weights in the sliding window to 0, for example, if a size of the sliding window is 5*5, the coarse-grained pruning unit sets 3*3 weights in the middle of the 5*5 sliding window to 0; or randomly selects at least one weight from the sliding window to set to 0. The above operation may be advantageous for providing precision of subsequent training operations.

Furthermore, the coarse-grained pruning unit and the operation unit may be configured to repeat performing coarse-grained pruning on the neural network and training the neural network according to the pruned weight until no weight meets the preset condition without losing a preset precision.

The preset precision is x %, where x is between 0-100, and x may have different choices depending on different neural networks and different disclosures.

In an optional embodiment, the range of X is 0-5.

Further, the processing device may include:
  a quantization unit configured to quantize the weight of the neural network and/or perform a first operation on the weight of the neural network after the coarse-grained pruning unit performs coarse-grained pruning on the weight of the neural network, and before the operation unit retrains the neural network according to the pruned weight to reduce a count of weight bits of the neural network.

In an embodiment, the weight of the neural network is specifically quantized by using a weight W0 to replace a weight W1 that satisfies a requirement, and the requirement is |W1−W0|≤∇W, where ∇W is a preset value.

The first operation may be reducing the value range of a data format corresponding to the weight or reducing the precision range of the data format corresponding to the weight.

Further, the operation unit may be specifically configured to:
  retrain the neural network by a back-propagation algorithm according to a pruned weight.

Specifically, the operation unit may be configured to perform a backward training algorithm on the neural network, receive the pruned neural network, and train the neural network adopting the back-propagation algorithm, where the pruned weight always remains 0 during the training process. The operation unit may transmit the trained neural network to the coarse-grained pruning unit for further pruning operation or directly outputs the trained neural network.

Specifically, the operation unit performs reverse computation on each layer of the neural network in the order opposite to the forward computation, and updates the weight by a gradient of the weight obtained by computation. The above process is the sequential iteration of neural network training. The whole training process needs to repeat this process several times. The reverse operation of each layer requires two operations: one is to obtain a weight gradient by using an output neuron gradient and the input neuron, and the other is to obtain an input neuron gradient by using the output neuron gradient and the weight (used as the output neuron gradient of the next layer in the reverse operation for it to perform the reverse operation); After performing the reverse operation of the neural network, the weight gradient of each layer is computed, and the operation unit updates the weight according to the weight gradient.

It should be pointed out that, during the training process of the neural network by the operation unit, the weight set to 0 remains 0 all the time.

In an embodiment of the present disclosure, the coarse-grained pruning unit of the processing device performs a coarse-grained pruning operation on the weight of the neural network to obtain the pruned weight, and the operation unit retrains the neural network according to the pruned weight. By performing coarse-grained pruning on the weight of the neural network, the storage and access of the subsequent values are reduced, and the subsequent computation is reduced as well, which improves the operation efficiency and reduces the power consumption.

Figure 4:
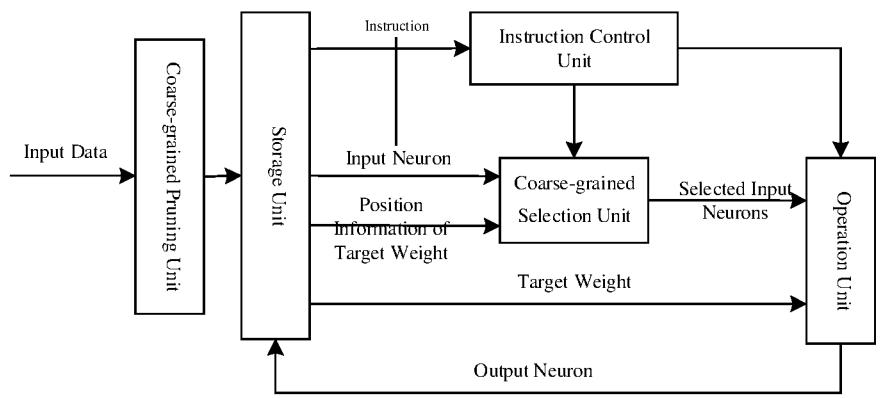
FIG. 4 is a schematic structure diagram of an accelerating device according to an embodiment of the disclosure.

FIG. 4 is a schematic structure diagram of an accelerating device according to an embodiment of the disclosure. As shown in FIG. 4, the accelerating device may include:
  a storage unit configured to store an input neuron, an output neuron, a weight, and an instruction of a neural network;
  a coarse-grained pruning unit configured to perform coarse-grained pruning on the weight of the neural network to obtain a pruned weight, and store the pruned weight and target weight position information into the storage unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The accelerating device may further include:
  an operation unit configured to perform training on the neural network according to the pruned weight;
  a coarse-grained selection unit configured to receive an input neuron and a position information of a target weight, and select the target weight and the corresponding input neuron of the weight, where an absolute value of the target weight is greater than a second given threshold.

Furthermore, the coarse-grained selection unit only selects the target weight and the corresponding neuron of the target to transmit to the operation unit.

The operation unit may be also configured to receive the input target weight and the corresponding neuron of the weight, complete the neural network operation by a multiplying and adding operation unit according to the target weight and the corresponding neuron of the weight to obtain the output neuron, and then transmit the output neuron back to the storage unit.

The storage unit may be also configured to store the intermediate results produced in the process of the neural network operation performed by the operation unit.

The accelerating device may further include:
  an instruction control unit configured to receive and decode the instruction to obtain control information, so as to control the coarse-grained selection unit performing selection operation and control the operation unit to perform an operation.

Further, when the storage unit stores the weight, only the target weight and the position information of the target weight are stored.

It should be noted that the storage unit, the coarse-grained pruning unit, the instruction control unit, the coarse-grained selection unit, and the operation unit are all physical hardware devices, not functional software units.

Figure 5:
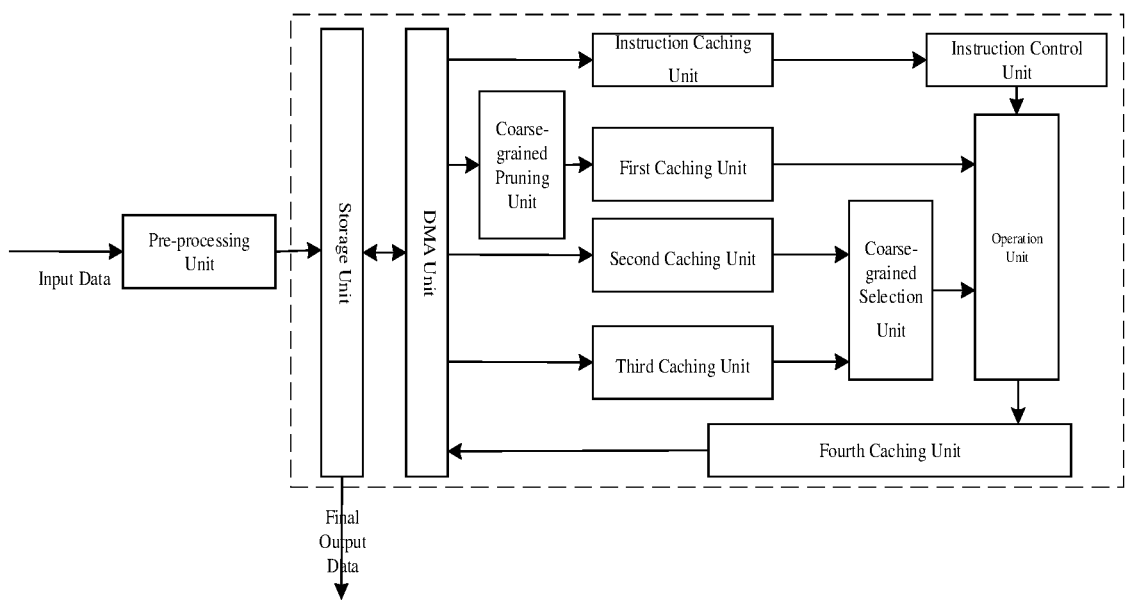
FIG. 5 is a schematic structure diagram of another accelerating device according to an embodiment of the disclosure.

FIG. 5 is a schematic structure diagram of another accelerating device according to an embodiment of the disclosure. As shown in FIG. 5, the accelerating device may further include: a pre-processing unit, a storage unit, a direct memory access (DMA) unit, an instruction caching unit, an instruction control unit, a coarse-grained pruning unit, a first caching unit, a second caching unit, a third caching unit, a coarse-grained selection unit, an operation unit, and a fourth caching unit.

The pre-processing unit may be configured to preprocess original data and input the preprocessed data into the storage unit, where the original data may include an input neuron, an output neuron, and weight.

Furthermore, the pre-processing may include data segmentation, Gaussian filter, binarization, regularization and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the first caching unit, the second caching unit, the third caching unit, or the fourth caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the first caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The first caching unit may be configured to cache a target weight whose absolute value is greater than the second given threshold.

The second caching unit may be configured to cache position data of the target weight; and the target weight position caching unit maps each connection weight in the input data to the corresponding input neuron.

Optionally, a one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the output neuron is connected to the input neuron by the weight, 0 indicating that the output neuron is not connected to the input neuron by the weight, and the connection status of the input neuron and output neuron of each group forming a string of 0 and 1 to indicate the connection relationship of the output neuron.

Optionally, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The third caching unit may be configured to cache an input neuron input to the coarse-grained selection unit.

The fourth caching unit may be configured to cache an output neuron output by the operation unit and an output neuron gradient obtained according to the output neuron.

The instruction control unit may be configured to receive an instruction in an instruction caching unit, and decode the instruction to generate control information to control the operation unit to perform a computation operation.

The coarse-grained selection unit may be configured to receive input neuron and target weight position information, and according to the target weight position information, select the input neuron that needs to be operated. The coarse-grained selection unit only selects a neuron corresponding to the target weight and transmits the neuron to the operation unit.

The operation unit may be configured to perform an operation on the input neuron and target weight according to the control information transmitted by the instruction control unit to obtain the output neuron, which is stored in the fourth caching unit; the output neuron gradient is obtained according to the output neuron, and the output neuron gradient is stored in the fourth caching unit.

Specifically, the coarse-grained selection unit may be configured to select the input neuron corresponding to the target weight from the input neuron of the input neuron caching unit according to the position information of the target weight, and then transmit the target weight and the corresponding input neuron of the weight to the operation unit.

In an embodiment, the operation unit may include a plurality of processing units to enable parallel computation to obtain different output neurons and store the output neurons into an output neuron caching unit. Each of the plurality of processing units contains a local weight selector module for further processing of dynamic coarse-grained sparse data. The coarse-grained selection unit may be configured to process the static sparsity by selecting the required input neurons. The working process of the coarse-grained selection unit is not described here, for details, please refer to FIG. 6.

Figure 6:
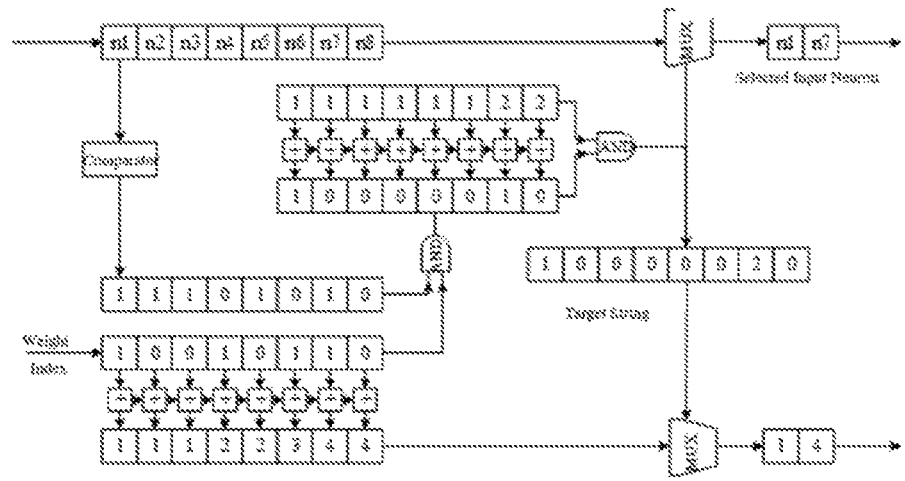
FIG. 6 is a flowchart of working process of a coarse-grained selection unit according to an embodiment of the disclosure.

Referring to FIG. 6, firstly, the coarse-grained selection unit may generate a neuron index according to the value of the input neuron, where each index indicates whether the corresponding neuron is useful ("0"); secondly, the coarse-grained selection unit may perform an "AND" operation on the generated neuron index and the position information of the weight (i.e., weight index) to obtain a neuron marker, where each bit of the neuron marker indicates whether the corresponding neuron is selected or not; thirdly, the coarse-grained selection unit may add each bit of the neuron marker to get a cumulative string, and then perform the "AND" operation between the cumulative string and the neuron marker to produce a target string used to select the input neuron; finally, the coarse-grained selection unit may use the target string to select the actual input neuron for subsequent computations in the operation unit. At the same time, the coarse-grained selection unit may produce an index string according to the target string and a cumulative string of weight index (i.e., position information of the weight) and pass the index string to the operation unit.

Figure 7:
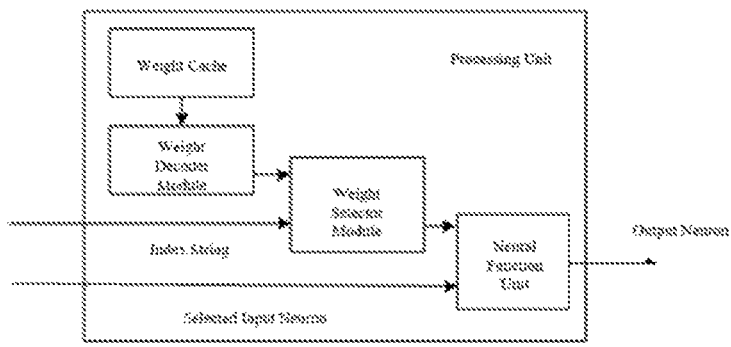
FIG. 7 is a schematic structure diagram of a processing unit according to an embodiment of the disclosure.

The operation unit may be mainly configured to process dynamic sparsity and effectively perform all operations of the neural network. The operation unit may include a plurality of processing units. As shown in FIG. 7, each processing unit may include a weight cache, a weight decoder module, a weight selector module, and a neuron function unit. Each processing unit may load weights from a local weight cache, because weights are independent between different output neurons, different processing for the weights are independent. A weight decoder module with a lookup table is placed next to the weight cache to extract the actual weight based on the weight codebook used in the local quantization and the compressed value in the weight dictionary.

Figure 8A:
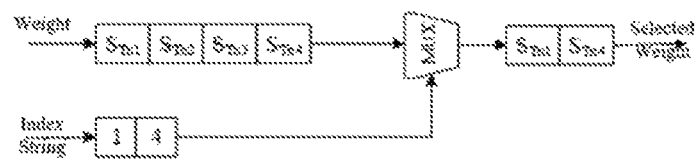
FIG. 8a is a schematic diagram of coarse-grained selection according to an embodiment of the disclosure.
Figure 8B:
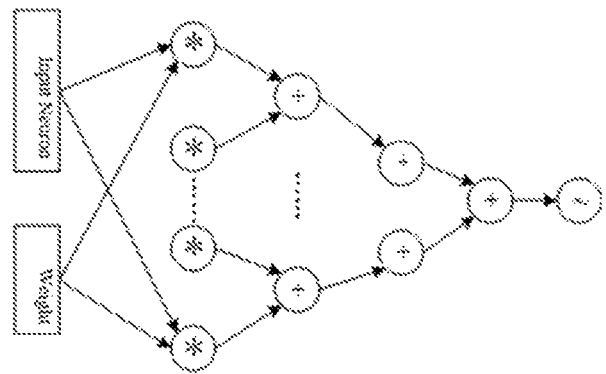
FIG. 8b is a schematic diagram of coarse-grained selection according to an embodiment of the disclosure.

As shown in FIG. 8a, the weight selector module may receive the index string and weight from the weight decoder module to select useful weights for computing the neuron function units of the processing unit. As shown in FIG. 8b, the neuron function unit of each processing unit may consist of a Tm multiplier, an adder tree and a non-linear function module. The neuron function unit may map the neural network to the processing unit using a time-sharing method, that is, each processing unit may process the output neuron in parallel, and M/Tm cycles are needed to compute the output neurons that require M multiplications because the processing unit can implement Tm multiplication in one cycle. And then, the neuron function unit may collect and assemble the output of all processing units for subsequent computation, or store the output to the output neuron caching unit.

The weight selector module may select the required weight only when considering dynamic sparse because the weight cache may store the weight compactly to achieve static sparsity. Referring to FIG. 8a, based on the index string of the neuron selector module containing the weight position information, the weights may be further filtered and the weights required for the computation may be selected. Each processing unit may work on a different output neuron to produce different weight. Therefore, the internal processing unit may use the weight selector module and the weight cache to avoid high bandwidth and delay.

It should be pointed out that dynamic sparse generally refers to input neuron sparse because the value of the input neurons changes as the input changes. The dynamic sparse may be mainly derived from the activation function of relu, because the function sets the input neuron whose absolute value is less than the threshold to 0. Static sparse generally refers to weight sparse, because a topology is no longer changed after the weight is pruned.

The instruction caching unit, the input neuron caching unit, the target weight caching unit, the target weight position caching unit, and the output neuron caching unit are all on-chip caching unit.

Specifically, the operation unit may include but not be limited to three parts: a first part is a multiplier, a second part is an adder tree, and a third part is an activation function unit. The first part may multiply first input data (in1) and second input data (in2) to get first output data (out1), where the process is: out=in1*in2. The second part may add third input data in3 through the adder tree to obtain second output data (out2), where in3 is a vector of length N, N is greater than 1, the process is: out2=in3 [1]+In3[2]+ . . . +in3[N], and/or add third input data (in3) by the adder tree and add fourth input data (in4) to obtain the second output data (out2), where the process is: out=in3 [1]+in3 [2]+ . . . +in3[N]+in4, or add the third input data (in3) and the fourth input data (in4) to obtain the second output data (out2), where the process is: out2=in3+in4. The third part may perform the activation function on fifth input data (in5) to obtain active output data (out), where the process is out3=active(in5), and the activation function may include sigmoid, tanh, relu, softmax, and the like; in addition to the active operation, the third part may further implement other non-linear functions, for example, the third part may perform an operation (f) on input data (in) to obtain the output data (out), where the process is: out=f(in).

Further, the operation unit may include a pooling unit, and the pooling unit obtains the output data (out) after performing a pooling operation on the input data (in), and the process is: out=pool(in), where pool represents the pooling operation, and the pooling operation may include but not be limited to: mean pooling, maximum pooling, or median pooling. The input data in is the data in a pooling core associated with the output data(out).

The operations performed by the operation unit may include the following parts: the first part multiplies first input data and second input data to obtain a product; the second part performs an adder tree operation, that is, the second part adds third input data through an adder tree step by step, or adds the third input data to fourth input data to obtain a sum; the third part performs an activation function on fifth data to obtain output data. The above several parts of the operations can be freely combined, so as to achieve a variety of different functions of the operations.

It should be noted that the pre-processing unit, the storage unit, the DMA unit, the coarse-grained pruning unit, the instruction caching unit, the instruction control unit, the first caching unit, the second caching unit, the third caching unit, the fourth caching unit, the coarse-grained selection unit, and the operation unit are all physical hardware devices, not functional software units.

Figure 9:
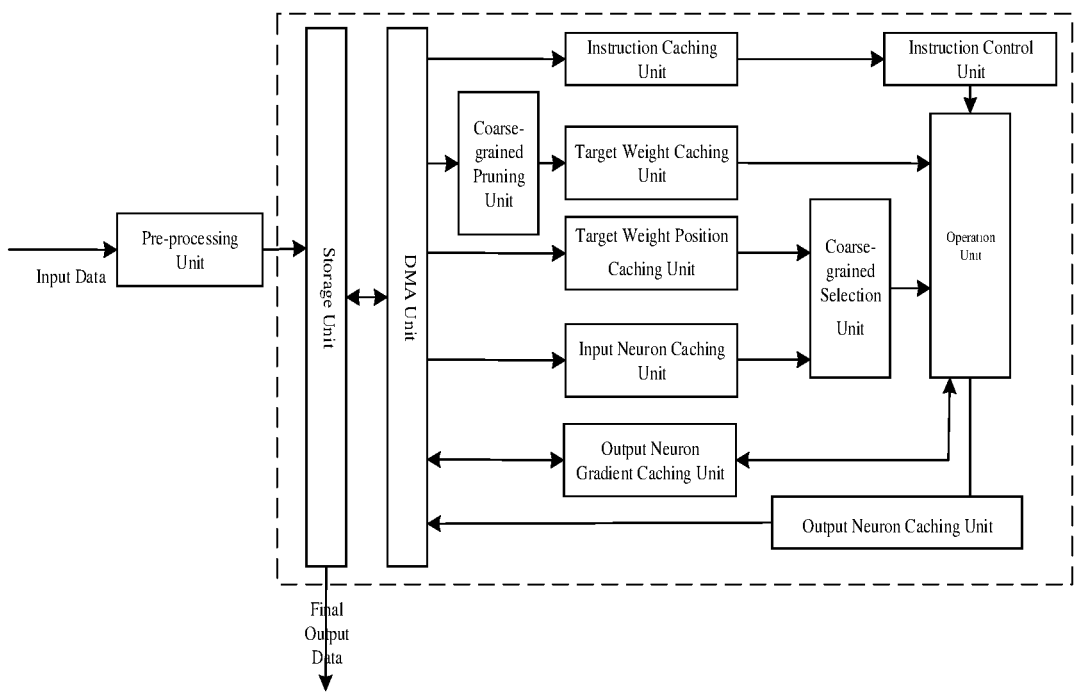
FIG. 9 is a schematic structure diagram of another accelerating device according to an embodiment of the disclosure.

FIG. 9 is a schematic structure diagram of another accelerating device according to an embodiment of the disclosure. As shown in FIG. 9, the accelerating device may further include: a pre-processing unit, a storage unit, a DMA unit, an instruction caching unit, an instruction control unit, a coarse-grained pruning unit, a target weight caching unit, a target weight position caching unit, an input neuron caching unit, a coarse-grained selection unit, an operation unit, an output neuron caching unit, and an output neuron gradient caching unit.

The pre-processing unit may be configured to preprocess original data and input the preprocessed data into the storage unit, where the original data may include input neuron, output neuron, and weight, and the pre-processing may include data segmentation, Gaussian filter, binarization, regularization, and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the target weight position caching unit, the input neuron caching unit, or the output neuron caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the target weight caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The target weight caching unit may be configured to cache the target weight.

The target weight position caching unit may be configured to cache position data of the target weight, and map each connection weight in the input data to the corresponding input neuron.

Optionally, the one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the input neuron is connected to the output neuron by the weight, 0 indicating that the input neuron is not connected to the output neuron by the weight, the connection status of the input and output of each group forming a string of 0 and 1 to indicate the connection relationship of the output neuron.

Optionally, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The input neuron caching unit may be configured to cache input neurons input to the coarse-grained selection unit.

The output neuron caching unit may be configured to cache the output neuron output by the operation unit.

The output neuron gradient caching unit may be configured to cache the gradient of the output neuron.

The instruction control unit may be configured to receive the instruction in the caching unit and decode the instruction to obtain control information, so as to control the operation unit to perform an operation.

The coarse-grained selection unit may be configured to receive the input neuron and the position information of the target weight and select the input neuron to be operated according to the target weight position information. The coarse-grained selection unit only selects the neurons corresponding to the target weight and transmits the selected neurons to the operation unit.

The operation unit may be configured to perform an operation according to the target weight and the corresponding input neuron of the weight obtained from the target weight caching unit to obtain the output neuron, and cache the output neuron into the output neuron caching unit.

The operation unit may be further configured to perform training according to the output neuron gradient and the pruned weight.

It should be noted that the functions of each unit of the accelerating device will not be described here. For details, please refer to the related description of the embodiment shown in FIG. 5.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron gradient caching unit, the output neuron caching unit, the coarse-grained selection unit, and the operation unit are all physical hardware devices, not functional software units.

Figure 10:
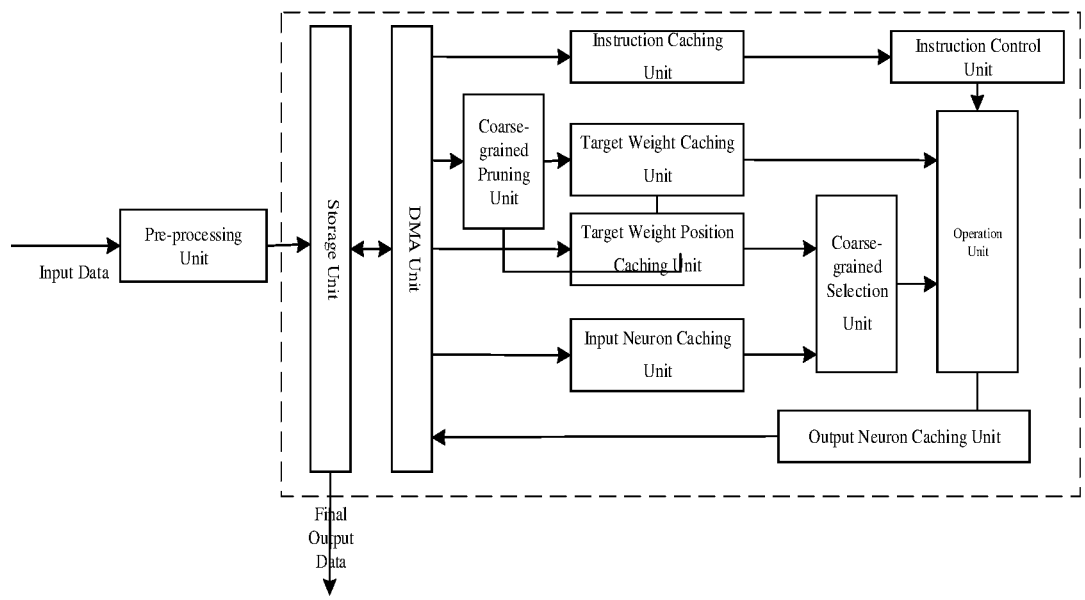
FIG. 10 is a schematic structure diagram of another accelerating device according to an embodiment of the disclosure.

FIG. 10 is a schematic structure diagram of another accelerating device according to an embodiment of the disclosure. As shown in FIG. 10, the accelerating device may further include:

the pre-processing unit, the storage unit, the DMA unit, the instruction caching unit, the instruction control unit, the coarse-grained pruning unit, the target weight caching unit, the target weight position caching unit, the input neuron caching unit, the coarse-grained selection unit, the operation unit, and the output neuron caching unit.

The pre-processing unit may be configured to preprocess original data and input the preprocessed data into the storage unit, where the original data may include input neuron, output neuron, and weight, and the pre-processing may include data segmentation, Gaussian filter, binarization, regularization, and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the target weight position caching unit, the input neuron caching unit, or the output neuron caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the target weight caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The target weight caching unit may be configured to cache the target weight.

The target weight position caching unit may be configured to cache target weight position data; the target weight position caching unit maps each connection weight in the input data to the corresponding input neuron.

Optionally, the one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the input neuron is connected to the output neuron by the weight, 0 indicating that the input neuron is not connected to the output neuron by the weight, the connection status of all the input and output of each group forming a string of 0 and 1 to indicate the connection relationship of the output neuron.

Optionally, the one-to-one cache method adopting by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The input neuron caching unit may be configured to cache the input neuron input to the coarse-grained selection unit.

The output neuron caching unit may be configured to cache the output neuron output by the operation unit.

The output neuron gradient caching unit may be configured to cache the gradient of the output neuron.

The instruction control unit may be configured to receive the instruction in the caching unit and decode the instruction to obtain control information, so as to control the operation unit to perform an operation.

The coarse-grained selection unit may be configured to receive the input neuron and the position information of the target weight and select the input neuron to be operated according to the target weight position information. The coarse-grained selection unit only selects the neurons corresponding to the target weight and transmits the selected neurons to the operation unit.

The operation unit may be configured to perform an operation according to the target weight and the corresponding input neuron of the weight obtained from the target weight caching unit to obtain the output neuron, and cache the output neuron into the output neuron caching unit.

It should be noted that the functions of each unit of the accelerating device will not be described here. For details, please refer to the relevant description of the embodiment shown in FIG. 5.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron gradient caching unit, the output neuron caching unit, the coarse-grained selection unit, and the operation unit are all physical hardware devices, not functional software units.

The processing method of the present disclosure will be specifically described by exemplifying the embodiments of a neural network processor in the following, but it should be understood that it is not intended to limit the present disclosure. The equivalent structure or equivalent process transformations made by the specific embodiments, or directly or indirectly applied in other related technical fields, are equally included in the scope of protection of the present disclosure.

Figure 11:
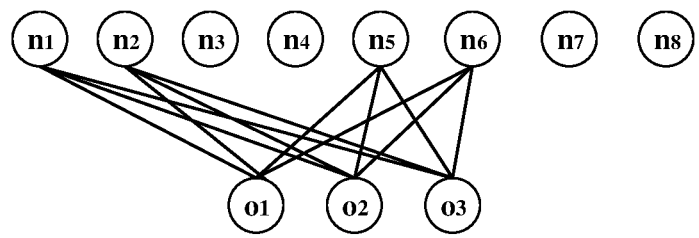
FIG. 11 is a schematic diagram of a specific embodiment of a processing method according to an embodiment of the disclosure.

FIG. 11 is a schematic diagram of a specific embodiment of a processing method according to an embodiment of the disclosure. FIG. 11 shows the result of a fully connected layer of a neural network after coarse-grained pruned. The fully connected layer has a total of 8 input neurons n1~n8 and 3 output neurons o1~o3, where the weights between the 4 input neurons n3, n4, n7, n8 and the 3 output neurons of o1, o2, o3 are set to 0 by coarse-grained sparsification; n1 is connected with o1, o2 and o3 by 3 weights of s11, s12 and s13; n2 is connected with o1, o2, o3 by 3 weights of s21, s22, s23; n5 is connected with o1, o2, o3 by 3 weights of s31, s32, s33; n6 is connected with o1, o2, o3 by 3 weights of s41, s42, s43. The bit string of 11001100 may be used to represent the connection status between the input neuron and the output neuron, that is, the first case of indicating the position information of the target weight, 1 represents that the input neuron is connected with the three output neurons, and 0 represents that the input neuron is not connected with any one of the three output neurons. Table 1 describes the information of neurons and weights in the embodiment, and Formula 1 describes an operation formula of the three output neurons of o1, o2, and o3. It can be seen from Formula 1 that o1, o2, and o3 will receive the same neuron for operation.

Fine-grained pruning refers to taking each weight as an independent object, if a weight meets a preset condition, it will be pruned; coarse-grained pruning refers to grouping the weights in a certain way, where each group includes a plurality of weights, if a group of weights meets a preset condition, the group of weights will be completely pruned.

TABLE 1

| Input Neuron | Output Neuron | | | Position of A Target Weight |
|---|---|---|---|---|
| | o1 | o2 | o3 | |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—Operation Formula of the Output Neuron:

$o1 = n1*s11 + n2*s12 + n5*s13 + n6*s14$ $o2 = n1*s21 + n2*s22 + n5*s23 + n6*s24$ $o3 = n1*s31 + n2*s32 + n5*s33 + n6*s34$

The processing device may transmit the position information of the 8 input neurons, 12 weights, 8 bits, and corresponding instructions to the storage unit. The coarse-grained selection unit may receive the position of the 8 input neurons and the target weight, and may select 4 neurons of n1, n2, n5, n6 that need to participate in the operation. The operation unit may receive the 4 selected neurons and weights, complete the operation of the output neuron by Formula 1, and then transmit the output neuron back to the storage unit.

In some embodiments of the present disclosure, an accelerating device is provided, which may include a memory storing executable instructions, a processor configured to perform the executable instructions in the storage unit in accordance with the processing method.

The processor may be a single processing unit, but may also include two or more processing units. In addition, the processor may also include a General Processing Unit (CPU) or a Graphic Processing Unit (GPU); it may also include a Field Programmable Gate Array (FPGA) or a Disclosure Specific Integrated Circuit (ASIC) to set and operate the neural network. The processor may also include an on-chip memory for caching (i.e., memory in the processing device).

The embodiments of the present disclosure also provide a neural network operation device which may include the accelerating device or the processing device described in the present disclosure, where the neural network operation device may be configured to acquire data to be operated and control information from other processing devices, perform specified neural network operation and/or training, and transmit the execution result to peripheral devices through an I/O interface. The peripheral devices may include a camera, a display, a mouse, a keyboard, a network card, a Wireless Fidelity (WIFI) interface, a server. When one or more computation devices are included, the computation devices can link and transfer data through a dedicated structure, for example, the plurality of operation devices conduct interconnect through Peripheral Component Interconnect-Express (PCIE) bus and transmit data to support operation/or training on a larger-scale neural network; the plurality of operation devices share the same control system or have their own control systems; the plurality of the operation devices share a memory or have their own memories; and the interconnection manner of the plurality of operation devices is an arbitrary interconnection topology.

The neural network operation device has high compatibility and can be connected to various types of servers through a PCIE interface.

Figure 12:
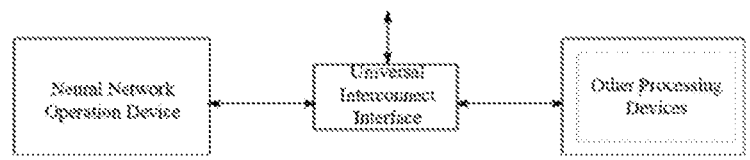
FIG. 12 is a schematic structure diagram of a combined processing device according to an embodiment of the disclosure.

The embodiments of the present disclosure provide a combined processing device which may include the neural network operation device, a universal interconnect interface, and other processing devices. The neural network operation device interacts with other processing devices to perform user-specified operations. FIG. 12 is a schematic structure diagram of the combined processing device.

The other processing devices may include one or more types of general-purpose/dedicated processor such as a CPU (Central Processing Unit), a GPU (Graphics Processing Unit), a neural network processor, and the like. The count of processors included in other processing devices is not limited. The other processing devices may serve as an interface between the neural network operation device and external data, and complete basic control such as data moving, opening and stopping of the neural network operation device; the other processing devices may also cooperate with the neural network operation device to complete the operation task.

The universal interconnect interface may be configured to transmit data and control instruction between the neural network operation device and other processing devices. The neural network operation device may acquire the needed input data from other processing devices and write them into the on-chip storage unit of the neural network operation device, acquire the control instruction from other processing devices and write them into an on-chip control cache of the neural network operation device, and acquire the data in the storage unit of the neural network operation device and then transmit them to other processing devices.

Figure 13:
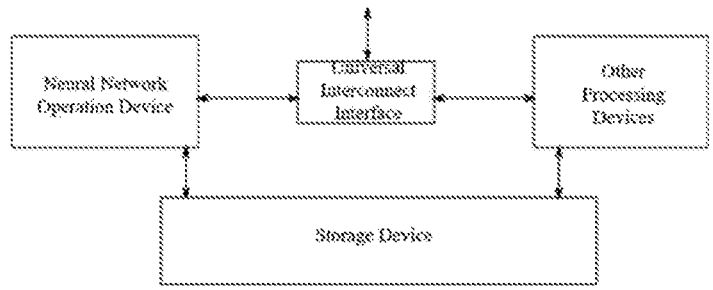
FIG. 13 is a schematic structure diagram of another combined processing device according to an embodiment of the disclosure.

Optionally, as shown in FIG. 13, the combined processing device may further include a storage device, which may be respectively connected to the neural network operation device and the other processing devices. The storage device may be configured to store data in the neural network operation device and the other processing devices, and may be particularly suitable for storing the data needed to be operated that cannot be stored completely in the internal storage part of the neural network operation device or other processing devices.

The combined processing device may be served as an SOC on-chip system for mobile phones, robots, drones, video monitoring devices, etc., effectively reducing the core area of the control part, increasing the processing speed, and reducing the overall power consumption. In this case, the universal interconnect interface of the combined processing device is connected with some components of the device, such as a camera, a display, a mouse, a keyboard, a network card, and a wifi interface.

In some embodiments, the present disclosure provides a neural network processor, which may include the neural network operation device or the combined processing device.

In some embodiments, the present disclosure provides a chip, which may include the neural network processor.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

Figure 14:
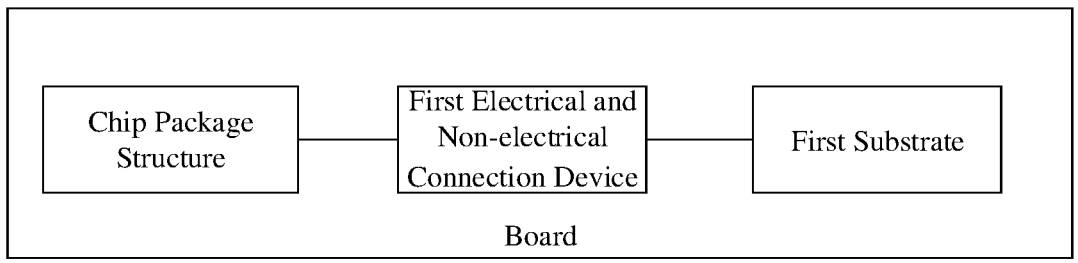
FIG. 14 is a schematic structure diagram of a neural network processor board card according to an embodiment of the disclosure.

FIG. 14 is a schematic structure diagram of a neural network processor board card according to an embodiment of the disclosure. As shown in FIG. 14, the neural network processor board card may include the chip package structure, a first electrical and non-electrical connection device, and a first substrate.

Figure 15:
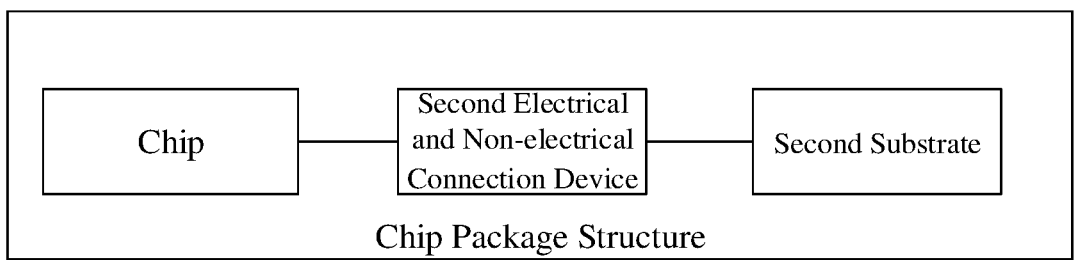
FIG. 15 is a schematic structure diagram of a chip package according to an embodiment of the disclosure.

The specific structure of the chip package structure is not limited in the disclosure. Optionally, as shown in FIG. 15, the chip package structure may include the chip, a second electrical and non-electrical connection device, and a second substrate.

The specific form of the chip in the present disclosure is not limited. The chip may include but not be limited to a neural network wafer integrated with a neural network processor, and the wafer may be made of silicon material, germanium material, quantum material or molecular material. The neural network wafer may be packaged according to the actual situation (for example, a harsh environment) and different disclosure requirements, so that most of the neural network wafer may be wrapped, and pins on the neural network wafer may be connected to the outside of the packaging structure through conductors such as gold wire, which can be used for circuit connection with the outer layer.

The types of the first substrate and the second substrate are not limited in the present disclosure, which may be a printed circuit board (PCB) or a printed wiring board (PWB), and other circuit boards. There are no limitations on the materials used to make the PCB.

The second substrate according to the present disclosure may be configured to carry the chip, and the chip package structure obtained by connecting the chip and the second substrate through the second electrical and non-electrical connection device is used for protecting the chip to facilitate further packaging of the chip package structure and the first substrate.

The specific package method and the corresponding structure of the second electrical and non-electrical connection device are not limited, and the appropriate package method can be selected and simply improved according to the actual situation and different disclosure requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package methods.

The Flip Chip may be suitable for the case where the requirement on the area after packaging is high or an inductor of a conductive wire and a transmission time of a signal are sensitive. In addition, Wire Bonding method may be adopted to reduce the cost and increase the flexibility of the package structure.

Ball Grid Array may provide more pins, and the average length of the pin of the conductive wire is short, which has the function of transmitting signals at high speed, where Pin Grid Array (PGA), 0 Insertion Force (ZIF), Single Edge Contact Connection (SECC), Land Grid Array (LGA) and other package method may be adopted.

Figure 16:
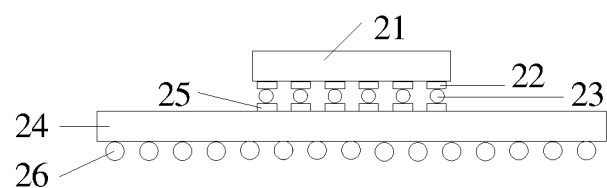
FIG. 16 is a schematic structure diagram of another chip package according to an embodiment of the disclosure.

Optionally, the package method of Flip Chip Ball Grid Array may be adopted to package the neural network chip and the second substrate. Please refer to FIG. 16 for a specific schematic diagram of package structure of the neural network chip. As shown in FIG. 16, the chip package structure may include a chip 21, a pad 22, a bump 23, a second substrate 24, a connection point 25 on the second substrate 24, and a pin 26.

The pad 22 is connected to the chip 21, and the bump 23 is formed by welding between the pad 22 and the connection point 25 on the second substrate 24 to connect the neural network chip 21 and the second substrate 24, thereby realizing the package of chip 21.

The pin 26 may be configured to connect with an external circuit of the package structure (for example, the first substrate on the board card) to transmit external data and internal data, which may facilitate data processing by the chip 21 or the corresponding neural network processor of the chip 21. The type and quantity of pins are not limited in this present disclosure. Different pin types can be selected according to different packaging technologies, and are arranged according to certain rules.

Optionally, the neural network chip package structure may further include an insulating filler disposed in the gap between the pad 22, the bump 23, and the connection point 25 for preventing interference between bumps, where the material of the insulating filler may be silicon nitride, silicon oxide or silicon oxynitride; the interference may include electromagnetic interference, inductance interference and the like.

Optionally, the neural network chip package structure may further include a heat dissipation device for dissipating heat of the neural network chip 21 during operation, where the heat dissipation device may be a piece of metal with good thermal conductivity, a heat sink or a radiator, for example, a fan.

Figure 17:
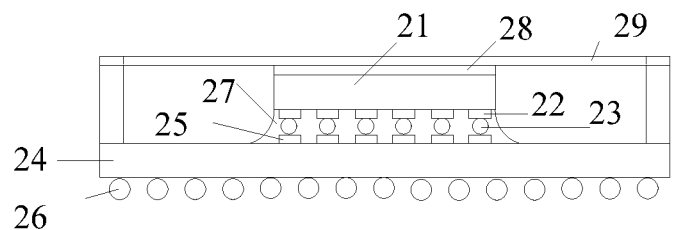
FIG. 17 is a schematic structure diagram of another chip package according to an embodiment of the disclosure.

For example, as shown in FIG. 17, the chip package structure may include a chip 21, a pad 22, a bump 23, a second substrate 24, a connection point 25 on the second substrate 24, a pin 26, an insulating filler 27, thermal compound 28, and a fin 29 with metal housing. Among them, the thermal compound 28 and the fin 29 with metal housing are configured to dissipate the heat of the chip 21 during operation.

Optionally, the chip package structure may further include a reinforcing structure, which is connected to the pad 22, and is buried in the bump 23 to enhance the connection strength between the bump 23 and the pad 22. The reinforcing structure may be a metal wire structure or a columnar structure, which is not limited herein.

The specific form of the first electrical and non-electrical device is not limited in the present disclosure. Please refer to the description of the second electrical and non-electrical device, that is, the chip package structure may be packaged by welding, or by connecting the second substrate and the first substrate through a connecting line or inserting method, so as to subsequently replace the first substrate or the chip package structure.

Optionally, the first substrate may include a memory unit interface for expanding a storage capacity, for example, a Synchronous Dynamic Random Access Memory (SDRAM), and a Double Date Rate (DDR) SDRAM. etc., by expanding the memory, the processing capacity of the neural network processor is improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, etc., used for data transmission between the package structure and external circuits, which can improve the speed and convenience of operation.

The neural network processor is packaged into a chip, the chip is packaged into a chip package structure, and the chip package structure is packaged into a board card. Data interaction with an external circuit (for example, a computer motherboard) may be performed through an interface (slot or ferrule) on the board card, that is, the function of the neural network processor may be implemented by directly using a neural network processor board card, which may also protect the chip. And other modules may be added to the neural network processor board card, which improves the disclosure range and computational efficiency of the neural network processor.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

Figure 18:
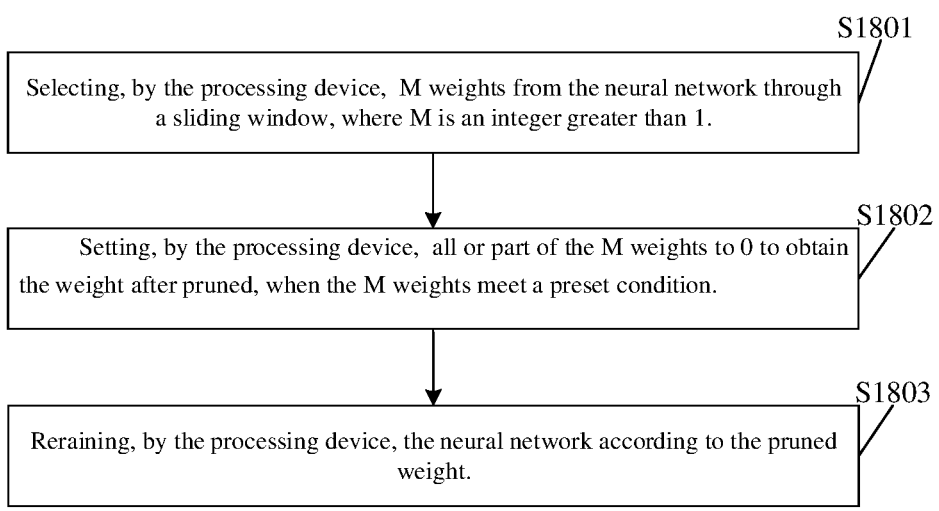
FIG. 18 is a flowchart of a processing method according to an embodiment of the disclosure.

FIG. 18 is a flowchart of a processing method according to an embodiment of the disclosure. The processing method is used for sparsification of the neural network, as shown in FIG. 11, the processing method may include:

in step S1801, selecting, by the processing device, M weights from the neural network through the sliding window, where M may be an integer greater than 1.

The neural network may include a fully connected layer, a convolutional layer, and a LSTM layer.

Figure 2:
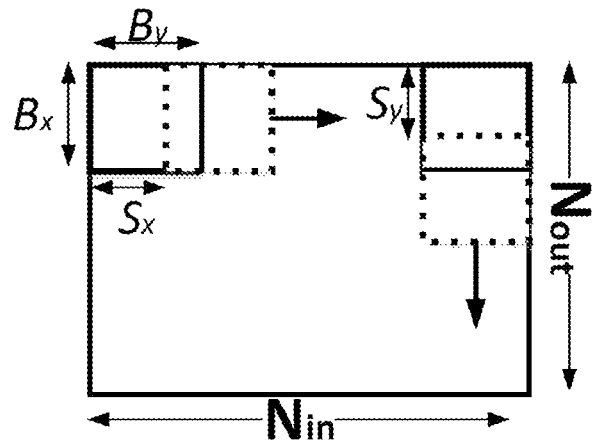
FIG. 2 is a schematic diagram of performing coarse-grained pruning on a fully connected layer of a neural network according to an embodiment of the disclosure.

The processing device selecting M weights from the fully connected layer of the neural network may include that:
as shown in FIG. 2, the weight of the fully connected layer is a two-dimensional matrix (Nin, Nout), where Nin represents the count of input neurons and Nout represents the count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout;
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
selecting M weights from the Nin*Nout weights through the sliding window, where M=Bin*Bout.

Figure 3:
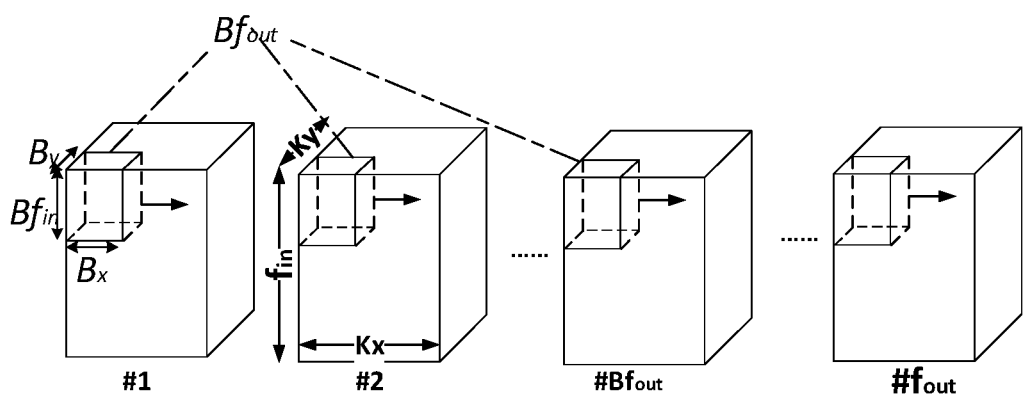
FIG. 3 is a schematic diagram of performing coarse-grained pruning on a convolutional layer of a neural network according to an embodiment of the disclosure.

The processing device selecting M weights from the convolutional layer of the neural network may include:
as shown in FIG. 3, the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;
making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and
selecting M weights from the Nfin*Nfout*Kx*Ky weights through the sliding window, where M=Bfin*Bfout*Bx*By.

The processing device selecting M weights from the LSTM layer of the neural network may include:
the weight of the LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i;
making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

In step S1802, setting, by the processing device, all or part of the M weights to 0 when the M weights meet the preset condition, to obtain the pruned weights.

The preset condition is: an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

It should be noted that the steps S1801 and S1802 can be regarded as the process of the processing device performing coarse-grained pruning on the neural network until no weight meets the preset condition without losing a preset precision.

Further, the processing device may repeatedly perform coarse-grained pruning on the weight of the neural network and perform training according to the pruned weight. The preset precision is x %, where x is between 0-5.

In step S1803, training, by the processing device, the neural network according to the pruned weight.

Specifically, the processing device performing training on the neural network according to the pruned weight may be:
retraining, by the processing device, the neural network by a back propagation algorithm according to the pruned weight.

Optionally, between performing coarse-grained pruning and retraining on the neural network, the method may further include the following step:
quantizing and/or reducing, by the processing device, bit of the weight.

It should be pointed out that during the training process of the neural network by the processing device, the weights set to 0 remains 0.

In the embodiments provided by the disclosure, it should be understood that the disclosed related devices and methods may be implemented in other manners. For example, the device embodiment described above is only schematic. For example, the units or the modules are hardware set to implement certain specific functions, division of the units or the modules is only logical function division and another division manner may be adopted during practical implementation. For example, a plurality of components or modules may be combined or integrated into a system or some characteristics may be neglected or not executed.

The embodiment of the present disclosure provides a coarse-grained sparsification processing method and corresponding processing device of the neural network, and provides a chip, a chip package structure, a board card, and an electronic device. The coarse-grained sparsification processing method may regularize the sparse neural network, facilitate accelerating by using hardware, and reduce the storage space of a target weight position. The neural network processor may fully exploit the characteristics of coarse-grained sparsification, reduce the memory access and the amount of computation, thereby obtaining an acceleration ratio and reducing energy consumption.

In an embodiment, the target weight is a weight whose absolute value is greater than a second given threshold.

FIG. 18 is a flowchart of a processing method according to an embodiment of the disclosure. In some embodiments of the present disclosure, a processing method is provided for sparsification of the neural network. As shown in FIG. 18, the processing method may include:

in step S1801, selecting, by the processing device, M weights from the neural network through the sliding window, where M may be an integer greater than 1.

The neural network may include a fully connected layer, a convolutional layer, and a LSTM layer.

The processing device selecting M weights from the fully connected layer of the neural network may include that:
as shown in FIG. 2, the weight of the fully connected layer is a two-dimensional matrix (NM, Nout), where Nin represents the count of input neurons and Nout represents the count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout.

The performing coarse-grained pruning on the weight of the fully connected layer of the neural network may include:
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and selecting M weights from the Nin*Nout weights through the sliding window, where M=Bin*Bout.

The processing device selecting M weights from the convolutional layer of the neural network may include:
as shown in FIG. 3, the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, where M=Bfin*Bfout*Bx*By.

The processing device selecting M weights from the LSTM layer of the neural network may include:

the weight of the LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i;

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

In step S1802, setting, by the processing device, all or part of the M weights to 0 when the M weights meet the preset condition, to obtain the pruned weights.

The preset condition is: an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Further, the processing device may repeatedly perform coarse-grained pruning on the weight of the neural network and perform training according to the pruned weight. The preset precision is x %, where x is between 0-5.

In step S1803, training, by the processing device, the neural network according to the pruned weight.

Specifically, the processing device performing training on the neural network according to the pruned weight may be:

retraining, by the processing device, the neural network by a back propagation algorithm according to the pruned weight.

Further, the processing device may perform an operation based on the trained neural network, and store the output neuron obtained by the operation into the storage device.

FIG. 1 is a schematic structure diagram of a processing device performing coarse-grained pruning and sparsification on a neural network according to an embodiment of the disclosure. As shown in FIG. 1, the processing device may include:

a coarse-grained pruning unit configured to perform coarse-grained pruning on the weight of the neural network to obtain a pruned weight, where the target weight is a weight whose absolute value is greater than a second given threshold.

The coarse-grained pruning unit is specifically configured to:

select M weights from the weights of a neural network through a sliding window, where M may be an integer greater than 1; and when the M weights meet the preset condition, all or part of the M weights may be set to 0; where the preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Furthermore, the neural network may include a fully connected layer, a convolutional layer and/or a LSTM layer. The weight of the fully connected layer is a two-dimensional matrix (Nin, Nout), where Nin represents the count of input neurons and Nout represents the count of output neurons, and the fully connected layer has Nin*Nout weights; the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer. The coarse-grained pruning unit may be specifically configured to:

perform coarse-grained pruning on the weight of the fully connected layer, where a sliding window is a two-dimensional sliding window with the size of Bin*Bout, Bin is a positive integer greater than 0 and less than or equal to Nin, and Bout is a positive integer greater than 0 and less than or equal to Nout;

make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;

select M weights from the Nin*Nout weights through the sliding window, and when the M weights meet the preset condition, all or part of the M weights may be set to 0, where M=Bin*Bout;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By;

select M weights from the Nfin*Nfout*Kx*Ky weights through the sliding window, and when the M weights meet the preset condition, all or part of the M weights may be set to 0, where M=Bfin*Bfout*Bx*By;

perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i;

make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights meet the preset condition, all or part of the M weights may be set to 0, where M=Bin_i*Bout_i.

The processing device may further include an operation unit configured to perform training according to the pruned weight, where the weight that has been set to 0 in the training process remains 0.

The operation unit integrates a back propagation training algorithm of the neural network, receives the neural network after coarse-grained pruned, and adopts the back propagation training algorithm to train, where the pruned weight in the retraining process remains 0. The operation unit transmits the trained neural network to the coarse-grained pruning unit for further pruning operations, or directly outputs the trained neural network.

The present disclosure provides a processing device (for example, an artificial neural network chip), and FIG. 4 is a schematic structure diagram of a processing device according to an embodiment of the disclosure. As shown in FIG. 4, the processing device may speed up the processing of the coarse-grained sparsification neural network, and fully explore the characteristics of coarse-grained sparsification, reduce access and computation, thereby obtaining an acceleration ratio and reducing energy consumption.

The processing device may include a storage unit, an instruction control unit, a coarse-grained pruning unit, a coarse-grained selection unit, and an operation unit. The processing device may be used for neural network processing.

The storage unit may be configured to store the neuron, the weight and the instruction of the neural network.

The coarse-grained pruning unit may be configured to perform coarse-grained pruning on the weight of the neural network to obtain the pruned weight and store the pruned weight and the position information of the target weight into the storage unit, where the target weight is a weight whose absolute value is greater than a second given threshold. The coarse-grained pruning unit may be specifically configured to:

select M weights from the weights of a neural network through a sliding window, where M may be an integer greater than 1; and when the M weights meet the preset condition, all or part of the M weights may be set to 0.

The information quantity of the M weights is less than the first given threshold.

Furthermore, the information quantity of the M weights is an arithmetic mean of an absolute value of the M weights, a geometric mean of the absolute value of the M weights or a maximum value of the absolute value of the M weights; the first given threshold is a first threshold, a second threshold, or a third threshold; and the information quantity of the M weights being less than the first given threshold may include:

the arithmetic mean of the absolute value of the M weights being less than the first threshold, or the geometric mean of the absolute value of the M weights being less than the second threshold, or the maximum value of the M weights being less than the third threshold.

Furthermore, the coarse-grained pruning unit and the operation unit may be configured to repeat performing coarse-grained pruning on the weights of the neural network and training the neural network according to the pruned weights until no weight meets the preset condition without losing a preset precision.

Furthermore, the neural network may include a fully connected layer, a convolutional layer and/or a LSTM (long and short term memory) layer. The weight of the fully connected layer is a two-dimensional matrix (Nin, Nout), where Nin represents the count of input neurons and Nout represents the count of output neurons, and the fully connected layer has Nin*Nout weights; the weight of the convolutional layer is a four-dimensional matrix (Nfin, Nfout, Kx, Ky), where Nfin represents the count of input feature maps, Nfout represents the count of output feature maps, (Kx, Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer. The coarse-grained pruning unit may be specifically configured to:

perform coarse-grained pruning on the weight of the fully connected layer, where a sliding window is a two-dimensional sliding window with the size of Bin*Bout, Bin is a positive integer greater than 0 and less than or equal to Nin, and Bout is a positive integer greater than 0 and less than or equal to Nout; make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; select M weights from the Nin*Nout weights through the sliding window, and when the M weights meet the preset condition, all or part of the M weights may be set to 0, where M=Bin*Bout;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; select M weights from the Nfin*Nfout*Kx*Ky weights through the sliding window, and when the M weights meet the preset condition, all or part of the M weights may be set to 0, where M=Bfin*Bfout*Bx*By; and perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i; make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; select M weights from the Bin_i*Bout_i weights through the sliding window, and when the M weights meet the preset condition, all or part of the M weights may be set to 0, where M=Bin_i*Bout_i.

The operation unit may be configured to perform training according to the pruned weight, and the weight that has been set to 0 during the training remains 0.

The instruction control unit may be configured to receive the instruction in the storage unit, and decode the instruction to obtain the control information so as to control the coarse-grained selection unit performing selection operation and the operation unit performing computation.

The coarse-grained selection unit may be configured to receive the input neuron and the position information of the target weight, select a group of weights of the neural network through the sliding window, set the selected weights to 0, and select the neurons corresponding to the target weight.

The operation unit may be configured to receive the selected input neuron and the target weight, complete the neural network operation by a multiplying and adding operation unit, obtain the output neuron, and retransmit the output neuron to the storage unit.

Further, when the storage unit stores the weight, only the target weight and the position data of the weight are stored.

Further, the coarse-grained selection unit only selects the neuron corresponding to the target weight and transmits them to the operation unit.

As shown in FIG. 10, the processing device may further include the pre-processing unit, which pre-processes the original data, and the pre-processing may include data segmentation, Gaussian filter, binarization, regularization, normalization, and the like.

The processing device may further include a DMA unit.

Further, the processing device may further include an instruction caching unit, an input neuron caching unit, a target weight caching unit, a target weight position caching unit, and an output neuron caching unit.

The storage unit may be mainly configured to store the neuron, the weight and the instruction of the neural network, when the storage unit stores the weight, only the target weight and the position data of the weight are stored.

The DMA unit may be configured to read/write data or instruction between the storage unit and the instruction caching unit, the target weight caching unit, the target weight position caching unit, the input neuron caching unit, and the output neuron caching unit.

The instruction caching unit may be configured to store a dedicated instruction.

The target weight caching unit may be configured to cache the target weight.

The target weight position caching unit may be configured to cache the position information of the target weight, and map each connection weight in the input data to the corresponding input neuron.

In one case, a one-to-one cache method adopted by the target weight position caching unit may be: 1 indicating that the input neuron is connected to the output neuron by the weight, 0 indicating that the input neuron is not connected to the output neuron by the weight, the connection status of all the input neurons and output neuron of each group forming a string of 0 and 1 to indicate the connection relationship of the output neuron. In another case, the one-to-one cache method adopting by the target weight position caching unit may be: 1 indicating that the input neuron is connected to the output neuron by the weight, 0 indicating that the input neuron is not connected to the output neuron by the weight, the connection status of all the out neurons and input neuron of each group forming a string of 0 and 1 to indicate the connection relationship of the input neuron. In another case, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output neuron.

The input neuron caching unit may be configured to cache the input neuron input to the coarse-grained selection unit.

The output neuron caching unit may be configured to cache the output neuron output by the operation unit.

The operation unit may be configured to perform corresponding operations on the data according to the instruction stored in the storage unit.

The operation unit may include but not be limited to three parts: a first part is a multiplier, a second part is an adder tree, and a third part is an activation function unit. The first part may multiply first input data (in1) and second input data (in2) to get first output data (out1), where the process is: out=in1*in2. The second part may add third input data in3 through the adder tree to obtain second output data (out2), where in3 is a vector of length N, N is greater than 1, the process is: out2=in3 [1]+In3 [2]+ . . . +in3[N], and/or add the third input data (in3) by the adder tree and add fourth input data (in4) to obtain the second output data (out2), where the process is: out=in3 [1]+in3 [2]+ . . . +in3[N]+in4, or add the third input data (in3) and the fourth input data (in4) to obtain the second output data (out2), where the process is: out2=in3+in4. The third part may perform the activation function on fifth input data (in5) to obtain active output data (out), where the process is out3=active(in5), and the activation function may include sigmoid, tanh, relu, softmax, and the like; in addition to the active operation, the third part may further implement other non-linear functions, for example, the third part may perform an operation (f) on input data (in) to obtain the output data (out), where the process is: out=f(in).

Further, the operation unit may include a pooling unit, and the pooling unit obtains the output data (out) after performing a pooling operation on the input data (in), and the process is: out=pool(in), where pool represents the pooling operation, and the pooling operation may include but not be limited to: mean pooling, maximum pooling, or median pooling. The input data in is the data in a pooling core associated with the output data(out).

The operations performed by the operation unit may include the following parts: the first part multiplies first input data and second input data to obtain a product; the second part performs an adder tree operation, that is, the second part adds third input data through an adder tree step by step, or adds the third input data to fourth input data to obtain a sum; the third part performs an activation function on fifth data to obtain output data. The above several parts of the operations can be freely combined, so as to achieve a variety of different functions of the operations.

It should be noted that the pre-processing unit, the storage unit, the DMA unit, the coarse-grained pruning unit, the instruction caching unit, the instruction control unit, the target weight position caching unit, the input neuron caching unit, the output neuron caching unit, the coarse-grained selection unit and the operation unit are all physical hardware devices, not functional software units.

The processing method of the present disclosure will be specifically described by exemplifying the embodiments of a neural network processor in the following, but it should be understood that it is not intended to limit the present disclosure. The equivalent structure or equivalent process transformations made by the specific embodiments, or directly or indirectly applied in other related technical fields, are equally included in the scope of protection of the present disclosure.

FIG. 11 is a schematic diagram of a specific embodiment of a processing method according to an embodiment of the disclosure. FIG. 11 shows the result of a fully connected layer of a neural network after coarse-grained pruned. The fully connected layer has a total of 8 input neurons n1~n8 and 3 output neurons o1~o3, where the weights between the 4 input neurons n3, n4, n7, n8 and the 3 output neurons of o1, o2, o3 are set to 0 by coarse-grained sparsification; n1 is connected with o1, o2 and o3 by 3 weights of s11, s12 and s13; n2 is connected with o1, o2, o3 by 3 weights of s21, s22, s23; n5 is connected with o1, o2, o3 by 3 weights of s31, s32, s33; n6 is connected with o1, o2, o3 by 3 weights of s41, s42, s43. The bit string of 11001100 may be used to represent the connection status between the input neuron and the output neuron, that is, the first case of indicating the position information of the target weight, 1 represents that the input neuron is connected with the three output neurons, and 0 represents that the input neuron is not connected with any one of the three output neurons. Table 1 describes the information of neurons and weights in the embodiment, and Formula 1 describes an operation formula of the three output neurons of o1, o2, and o3. It can be seen from Formula 1 that o1, o2, and o3 will receive the same neuron for operation.

Fine-grained pruning refers to taking each weight as an independent object, if a weight meets a preset condition, it will be pruned; coarse-grained pruning refers to grouping the weights in a certain way, where each group includes a plurality of weights, if a group of weights meets a preset condition, the group of weights will be completely pruned.

TABLE 2

| Input Neuron | Output Neuron | | | Position of A Target Weight |
|---|---|---|---|---|
| | o1 | o2 | o3 | |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—Operation Formula of the Output Neuron:

$$o1 = n1*s11 + n2*s12 + n5*s13 + n6*s14$$

$$o2 = n1*s21 + n2*s22 + n5*s23 + n6*s24$$

$$o3 = n1*s31 + n7*s32 + n5*s33 + n6*s34$$

The processing device may transmit the position information of the 8 input neurons, 12 weights, 8 bits, and corresponding instructions to the storage unit. The coarse-grained selection unit may receive the position of the 8 input neurons and the target weight, and may select 4 neurons of n1, n2, n5, n6 that need to participate in the operation. The operation unit may receive the 4 selected neurons and weights, complete the operation of the output neuron by Formula 1, and then transmit the output neuron back to the storage unit.

In some embodiments of the present disclosure, a processing device is provided, which may include a memory storing executable instructions, a processor configured to perform the executable instructions in the storage unit in accordance with the processing method.

The processor may be a single processing unit, but may also include two or more processing units. In addition, the processor may also include a General Processing Unit (CPU) or a Graphic Processing Unit (GPU); it may also include a Field Programmable Gate Array (FPGA) or a Disclosure Specific Integrated Circuit (ASIC) to set and operate the neural network. The processor may also include an on-chip memory for caching (i.e., memory in the processing device).

In some embodiments, the present disclosure provides a chip, which may include the processing device.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

Those skilled in the art should understand that the modules in the devices of the embodiment may be adaptively changed and placed in one or more different devices of the embodiment. The modules or units or components of the embodiment may be combined into one module or unit or component, and may be divided into a plurality of sub-modules or sub-units or sub-components. In addition to the above characteristics and/or process or that at least some of units are mutually exclusive, all of the characteristics, processes or units of any method or device disclosed in this specification (including accompanying claims, abstracts and drawings) may be combined in any manner. Unless there are clear statements, each feature disclosed in this specification (including accompanying claims, abstracts and drawings) can be replaced by an alternative feature of the same, equivalent or similar purpose.

The purposes, technical solutions, and beneficial effects of the present disclosure are further described above with the specific embodiments in detail. It is to be understood that the above is only the specific embodiment of the disclosure and not intended to limit the disclosure. Any modifications, equivalent replacements, improvements, and the like made within the spirit and principle of the disclosure shall fall within the scope of protection of the disclosure.

What is claimed is:

1. A processing device, comprising:
    a storage unit configured to store multiple input neurons, at least one output neuron, multiple weights, and an instruction of a neural network;
    a coarse-grained pruning unit configured to perform coarse-grained pruning on the weights of the neural network to obtain pruned weights and store the pruned weights and position information of one or more target weights into the storage unit, wherein an absolute value of each of the target weights is greater than a positive second given threshold, and the coarse-grained pruning unit is specifically configured to:
        select one or more weights from weights of the neural network through a sliding window; and
        when the one or more weights meet a preset condition, set the selected weights to 0;
        determine position information of the target weights among the pruned weights based on the position of the selected weights that are set to zero;
    a coarse-grained selection unit configured to
        receive the multiple input neurons, the position information of the target weights, and the target weights and
        select one or more input neurons corresponding to the target weights according to the position information of the target weights; and
    an operation unit configured to perform training according to the pruned weights, and the selected weights that have been set to 0 in the training process remain 0, perform a neural network operation according to the target weights and the selected input neurons corresponding to the target weights to generate the at least an one output neuron, and transmit the output neuron to the storage unit as an input neuron of a next layer.

2. The processing device of claim 1, wherein the preset condition includes:
    an information quantity of the selected weights is less than a first given threshold.

3. The processing device of claim 2, wherein the information quantity of the selected weights is an arithmetic mean of an absolute value of the selected weights, a geometric mean of the absolute value of the selected weights, or a maximum value of selected M weights; the first given threshold is a first threshold, a second threshold, or a third threshold; and the information quantity of the selected weights being less than the first given threshold includes:
    the arithmetic mean of the absolute value of the selected weights being less than the first threshold, or the geometric mean of the absolute value of the selected weights being less than the second threshold, or the maximum value of the selected weights being less than the third threshold.

4. The processing device of claim 1, wherein the coarse-grained pruning unit and the operation unit are configured to:
    repeat performing coarse-grained pruning on the weights of the neural network and training the neural network according to the pruned weights until no weight meets the preset condition without losing a preset precision.

5. The processing device of claim 1, wherein the neural network includes a fully connected layer, a convolutional layer, and/or a LSTM layer; a weight of the fully connected layer is a two-dimensional matrix (Nin, Nout), where Nin represents a count of input neurons and Nout represents a count of output neurons, and the fully connected layer has Nin*Nout weights; a weight of the convolutional layer is a four-dimensional matrix (Nfin, Nfout, Kx, Ky), where Nfin represents a count of input feature maps, Nfout represents a count of output feature maps, (Kx, Ky) is a size of a convolution kernel, and the convolutional layer has Nfin*Nfout*Kx*Ky weights; a weight of LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer.

6. The processing device of claim 5, wherein the coarse-grained pruning unit is specifically configured to:
perform coarse-grained pruning on the weights of the fully connected layer, where the sliding window is a two-dimensional sliding window with a size of Bin*Bout, Bin is a positive integer greater than 0 and less than or equal to Nin, and Bout is a positive integer greater than 0 and less than or equal to Nout;
make the sliding window slide Sin stride in a direction of Bin, or slide Sout stride in a direction of Bout, where Sin is a positive integer greater than 0 and less than or equal to Bin, and Sout is a positive integer greater than 0 and less than or equal to Bout; and
select M weights from Nin*Nout weights through the sliding window, and when the M weights meet the preset condition, all or part of the M weights are set to 0, where M=Bin*Bout.

7. The processing device of claim 5, wherein the coarse-grained pruning unit is further configured to:
perform coarse-grained pruning on the weights of the convolutional layer, the sliding window is a four-dimensional sliding window with a size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;
make the sliding window slide Sfin stride in a direction of Bfin, or slide Sfout stride in a direction of Bfout, or slide S stride in a direction of Bx, or slide Sy stride in a direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and
select M weights from Nfin*Nfout*Kx*Ky weights through the sliding window, and when the M weights meet the preset condition, all or part of the M weights are set to 0, where M=Bfin*Bfout*Bx*By.

8. The processing device of claim 5, wherein the coarse-grained pruning unit is further configured to:
perform coarse-grained pruning on the weights of the LSTM layer, a size of the sliding window is Bin_i*Bout_i, where Bin_i is a positive integer greater than 0 and less than or equal to Nin_i, and Bout_i is a positive integer greater than 0 and less than or equal to Nout_i;
make the sliding window slide Sin_i stride in a direction of Bin_i, or slide Sout_i stride in a direction of Bout_i, where Sin_i is a positive integer greater than 0 and less than or equal to Bin_i, and Sout_i is a positive integer greater than 0 and less than or equal to Bout_i; and
select M weights from Bin_i*Bout_i weights through the sliding window, and when the M weights meet the preset condition, all or part of the M weights are set to 0, where M=Bin_i*Bout_i.

9. The processing device of claim 1, further comprising:
an instruction control unit configured to receive the instruction and generate a control instruction to control the operation unit after decoding.

10. The processing device of claim 1, wherein the storage unit is configured to store the target weights and the position information of the target weights.

11. The processing device of claim 1, further comprising:
a pre-processing unit configured to preprocess the input neurons and the weights, and input the preprocessed data to the storage unit.

12. The processing device of claim 1, further comprising:
an instruction caching unit configured to cache the instruction;
a target weight caching unit configured to cache data of the target weights;
a target weight position caching unit configured to cache the position information of the target weights;
an input neuron caching unit configured to cache the input neurons; and
an output neuron caching unit configured to cache the output neuron.

13. The processing device of claim 12, wherein the target weight position caching unit is configured to cache the position information of the target weights, and map each connection weight in the input data to the corresponding input neuron.

14. The processing device of claim 1, further comprising:
a DMA (direct memory access) unit configured to read and write data or instruction between the storage unit and the instruction caching unit, the target weight caching unit, the target weight position caching unit, the input neuron caching unit, or the output neuron caching unit.

15. The processing device of claim 1, wherein the operation unit includes at least one of the following:
a multiplier configured to multiply first input data and second input data to obtain a product;
one or more adders configured to add third input data step by step; and
an activation function unit configured to get output data by performing action function on fifth data, where the activation function includes sigmoid, tanh, relu or softmax.

16. The processing device of claim 1, wherein the operation unit further includes a pooling unit configured to perform a pooling operation on input data to obtain output data after pooling operation, where the pooling operation includes mean pooling, maximum pooling, or median pooling.

17. A data processing method, comprising:
storing, by a storage unit, multiple input neurons, at least an output neuron, multiple weights, and an instruction of a neural network;
performing, by a coarse-grained pruning unit, coarse-grained pruning on the weights of the neural network to obtain pruned weights;
storing, by the coarse-grained pruning unit, the pruned weights and position information of one or more target weights into the storage unit, wherein an absolute value of each of the target weights is greater than a second given threshold;

selecting, by the coarse-grained pruning unit, one or more weights from weights of the neural network through a sliding window;

setting, by the coarse-grained pruning unit, at least a portion of the selected weights to 0;

determining, by the coarse-grained pruning unit, position information of the target weights among the pruned weights based on the position of the selected weights that are set to zero;

receiving, by a coarse-grained selection unit, the multiple input neurons and the position information of the target weights, and the target weights;

selecting, by the coarse-grained selection unit, one or more input neurons corresponding to the target weights according to the position information of the target weights;

performing, by an operation unit, training according to the pruned weights, and the weights that have been set to 0 in the training process remain 0;

performing, by the operation unit, a neural network operation according to aft the target weights and the selected input neurons corresponding to the target weights to generate the at least an one output neuron; and transmitting, by the operation unit, the output neuron to the storage unit as an input neuron of a next layer.

18. The data processing method of claim 17, wherein the preset condition includes:

an information quantity of the selected weights is less than a first given threshold.

19. The data processing method of claim 18, wherein the information quantity of the selected weights is an arithmetic mean of an absolute value of the selected M weights, a geometric mean of the absolute value of the selected weights, or a maximum value of the selected weights; the first given threshold is a first threshold, a second threshold, or a third threshold; and the information quantity of the selected weights being less than the first given threshold includes: the arithmetic mean of the absolute value of the selected weights being less than the first threshold, or the geometric mean of the absolute value of the selected weights being less than the second threshold, or the maximum value of the selected weights being less than the third threshold.

20. An electronic device, comprising:

a processing device that includes:
 a storage unit configured to store multiple input neurons, at least one output neuron, multiple weights, and an instruction of a neural network;
 a coarse-grained pruning unit configured to perform coarse-grained pruning on the weights of the neural network to obtain weights and store the pruned weights and position information of none or more target weights into the storage unit, wherein an absolute value of each of the target weights is greater than a second given threshold, and the coarse-grained pruning unit is specifically configured to:

select one or more weights from weights of the neural network through a sliding window; and when the selected one or more weights meet a preset condition, set the selected weights to zero;

determine position information of the target weights among the pruned weights based on the position of the selected weights that are set to zero;

a coarse-grained selection unit configured to receive the multiple input neurons and the position information of the target weights, and the target weights, and select one or more input neurons corresponding to the target weights according to the position information of the target weights; and an operation unit configured to perform training according to the pruned weights, and the selected weights that have been set to 0 in the training process remain 0, perform a neural network operation according to the target weights and the selected input neurons corresponding to the target weights to generate the at least one output neuron, and transmit the output neuron to the storage unit as an input neuron of a next layer.

* * * * *